United States Patent [19]
Tanaka et al.

[11] Patent Number: 5,384,205
[45] Date of Patent: Jan. 24, 1995

[54] MULTI-LAYER SLIDE BEARING HAVING AL-SN ALLOY LAYER WITH HIGH FATIGUE STRENGTH AND CONFORMABILITY

[75] Inventors: Tadashi Tanaka, Konan; Masaaki Sakamoto, Nagoya; Yoshiaki Sato, Gifu, all of Japan

[73] Assignee: Daido Metal Company Ltd., Tokyo, Japan

[21] Appl. No.: 125,745

[22] Filed: Sep. 24, 1993

[30] Foreign Application Priority Data

Oct. 26, 1992 [JP] Japan .................. 4-287370

[51] Int. Cl.6 .......................................... F16C 33/12
[52] U.S. Cl. .................. 428/643; 428/653; 428/654
[58] Field of Search ............ 428/654, 653, 643, 645, 428/646, 650; 384/912

[56] References Cited

U.S. PATENT DOCUMENTS

| | | | |
|---|---|---|---|
| 3,195,991 | 7/1965 | Stern | 428/654 |
| 3,950,141 | 4/1976 | Roemer | 428/654 |
| 4,188,079 | 2/1980 | Mori | 428/654 |
| 4,189,525 | 2/1980 | Mori | 428/654 |
| 5,075,177 | 12/1991 | Tanaka et al. | 428/653 |
| 5,112,416 | 5/1992 | Tanaka et al. | 428/654 |
| 5,162,100 | 11/1992 | Tanaka et al. | 384/912 |

FOREIGN PATENT DOCUMENTS

| | | | |
|---|---|---|---|
| 55-14823 | 2/1980 | Japan | 428/654 |
| 6214024 | 1/1983 | Japan . | |
| 3168411 | 7/1991 | Japan . | |
| 2228743 | 9/1990 | United Kingdom . | |
| 2247467 | 3/1992 | United Kingdom . | |
| 2252564 | 8/1992 | United Kingdom . | |
| 2252565 | 8/1992 | United Kingdom . | |

*Primary Examiner*—John Zimmerman
*Attorney, Agent, or Firm*—Browdy and Neimark

[57] ABSTRACT

A multi-layer bearing having an Al—Sn bearing alloy layer which has high fatigue strength and good conformability with a mating member further comprising a backing steel plate and an intermediate bonding layer of another aluminum alloy. The Al—Sn alloy consists essentially of, by weight, 7 to 20% Sn and balance of Al and impurities, and has a hardness of Hv 50 to 80. The aluminum alloy of the intermediate bonding layer consists essentially of, by weight, at least one of up to 1.7% Mn, up to 1.2% Cu and up to 1.8% Mg, and balance of Al and impurities, and a hardness rate of the aluminum alloy of the intermediate bonding layer to the Al—Sn bearing alloy exceeds Hv 70% and is not greater than 90%.

21 Claims, 2 Drawing Sheets

FIG. 1

RESULTS OF FATIGUE TEST I
(AVERAGE VALUE OF PLURALITY OF EACH)

FIG. 2

RESULTS OF FATIGUE TEST 2
(AVERAGE VALUE OF A PLURALITY OF EACH)

| | NO. | MAXIMUM LOAD AT WHICH NO FATIGUE IS CAUSED (MPa) 100 110 120 130 140 |
|---|---|---|
| COMPARATIVE EXAMPLE | 1 | ~115 |
| | 2 | ~130 |
| | 3 | ~120 |
| | 4 | ~130 |
| | 5 | ~120 |
| | 6 | ~135 |
| | 7 | ~133 |
| | 8 | ~125 |
| | 9 | ~125 |
| | 10 | ~125 |
| | 11 | ~110 |
| | 12 | ~110 |
| | 13 | ~120 |
| | 14 | ~110 |
| | 15 | ~105 |
| INVENTION EXAMPLE | 16 | ~120 |
| | 17 | ~135 |
| | 18 | ~120 |
| | 19 | ~130 |
| | 20 | ~130 |
| | 21 | ~140 |
| | 22 | ~137 |
| | 23 | ~130 |
| | 24 | ~125 |
| | 25 | ~140 |
| | 26 | ~127 |
| | 27 | ~122 |
| | 28 | ~130 |
| | 29 | ~133 |
| | 30 | ~130 |

MULTI-LAYER SLIDE BEARING HAVING AL-SN ALLOY LAYER WITH HIGH FATIGUE STRENGTH AND CONFORMABILITY

FIELD OF THE INVENTION

The present invention relates to a multi-layer slide bearing having a bearing aluminium alloy layer and, more particularly, to a multi-layer slide bearing excellent in fatigue strength and conformability with a mating sliding contact member for a high-power engine of an automobile and general industrial machines.

BACKGROUND OF THE INVENTION

As a conventional aluminium alloy bearing of this type, for example, there have been known bearings disclosed in JP-B2-62-14024 and JP-A-3-168411. The former discloses a bearing comprising a bearing alloy which mainly consists of an Al—Sn alloy and a backing metal plate (or layer) which are bonded through an intermediate bonding layer of low hardness consisting of aluminium or aluminium alloy, and are machined. The latter discloses a bearing comprising an aluminium alloy and a backing metal plate (or layer) having high hardness between which an intermediate bonding layer of slightly higher hardness is interposed, to thereby improve the fatigue strength. However, considering recent demands from the user such as weight reduction and performance improvement of an engine, the fatigue strength provided by the above-mentioned bearing structures tends to be rather insufficient. In addition to the method of using an Al alloy as an intermediate bonding layer, there has been well known a method of nickel plating of an intermediate bonding layer on a backing steel plate (or layer).

The known bearing is excellent in conformability and anti-seizure property which are important characteristics for a slide bearing. However, in accordance with speed increasing and power enhancing developments of internal combustion engines in recent years, a load acting on the bearing increases, which results particularly in problems of fatigue and cracks of the intermediate bonding layer. Moreover, nickel plating is unfavorable in cushion property and hardly satisfactory in respect of conformability of the bearing.

SUMMARY OF THE INVENTION

Taking account of such a technical background, the present invention is directed to providing a multi-layer slide bearing which solves the problems of the conventional technique and is excellent in fatigue strength and conformability with a mating sliding contact member.

This attempt has been achieved by providing a multi-layer slide bearing described below.

The multi-layer slide bearing comprising an Al—Sn bearing alloy layer having high fatigue strength and good conformability with a mating sliding contact member, wherein the bearing further comprises a backing steel plate and an intermediate bonding layer of mother aluminium alloy, wherein the Al—Sn bearing alloy consists essentially of, by weight, 7 to 20% Sn, up to 4% Si, and the balance of Al and unavoidable impurities, and has a hardness of Hv 50 to 80, the intermediate bonding layer of the aluminium alloy consists essentially of by weight, at least one element of up to 1.7% Mn, up to 1.2% Cu and up to 1.8% Mg, and the balance of Al and unavoidable impurities, and a rate of hardness (hardness rate) of the intermediate bonding layer of the aluminium alloy to hardness of the Al—Sn bearing alloy in terms of Vickers hardness exceeds 70% and is not more than 90%.

The Al—Sn bearing alloy can be divided into two kinds, i.e., one containing Si ($0 < Si \leq 4\%$) and the other containing no Si (Si=0%).

In addition to Al, Sn and Si, the Al—Sn bearing alloy may further contain at least one element selected from the group each of Mn, Mg, V, Ni, Cr, Zr and B, 0.2 to 5% Cu, 0.1 to 3% Pb, 0.1 to 3% Sb, and 0.01 to 1% Ti, as additional components.

In addition to at least one element of Mn, Cu and Mg, and Al, the aluminium alloy of the intermediate bonding layer may further contain up to 3 weight %, in total, of at least one element of Si, Cr, Ti and Fe, as additional components.

If necessary, an overlay made of Sn, Pb or an alloy whose main component is Sn or Pb may be formed on the sliding layer of the Al—Sn bearing alloy. It is also recommended to plate the sliding contact surface or the entirety surface of the bearing with Sn or Pb by flash process.

In such a bearing, hardness of the Al—Sn bearing alloy is limited to Hv 50 to 80, and the hardness rate of the intermediate bonding layer of the aluminium alloy to the Al—Sn bearing alloy is limited to greater than 70% and not greater than 90%. Reasons of these factors and reasons for determining amounts of components of the alloys will now be described.

The reasons for limiting the hardness of the Al—Sn bearing alloy are that if it is less than Hv 50 and the alloy has a low strength, fatigue is caused under a high load when the Al—Sn bearing alloy is applied to a high-power engine, and that if the hardness exceeds Hv 80, a bearing made of such an alloy involves manufacturing problems.

If the hardness rate of the intermediate bonding layer of the aluminium alloy to the Al—Sn bearing alloy is 70% or less, when the bearing is used under extremely severe conditions, main components of the Al—Sn bearing alloy can not be held within the alloy, but may be displaced or mechanically diffused into the intermediate bonding layer, or the intermediate bonding layer itself may be deformed and cracked due to fatigue with relation to insufficient hardness. Also, if the hardness rate exceeds 90%, conformability to be provided by the Al—Sn bearing alloy layer will be cancelled.

BRIEF DESCRIPTION OF THE DRAWINGS

FIG. 1 is a graph showing results of a bearing fatigue test 1; and

FIG. 2 is a graph showing results of a bearing fatigue test 2.

DETAILED DESCRIPTION OF THE INVENTION

The reasons of the amount limitation of each component of an Al—Sn bearing alloy will be described below.

(1) Sn (7 to 20 weight %)

Sn improves facial properties such as anti-seizure property, conformability and embedability as a bearing. When the Sn content is less than 7%, the above-mentioned effects are small. When it exceeds 20%, mechanical properties of the bearing alloy are deteriorated, and such an bearing alloy can not be used under severe conditions in the case of, for example, a high-power engine.

(2) Si (up to 4 weight %)

Si dissolves in the aluminium matrix and crystallizes as silicon particles of high hardness, so as to enhance the strength of the bearing alloy. When silicon particles are distributed in the structure, only the soft aluminium matrix on the surface are worn, and the surface becomes microscopically uneven. Consequently, the silicon particles which remain as convex parts bear a high load while maintaining non-agglutination property, whereas concave parts serve as oil receivers, so that the bearing alloy well bears high load, under conditions of a thin oil film and a metal to metal contact. Further, the finely distributed Si particles have a function to grind minute projections and burrs on the associated shaft, and improve the anti-seizure property. When the Si content exceeds 4%, the bearing alloy becomes brittle, and plastic workability (e.g., roll-working ability) of the bearing alloy is degraded.

(3) Mn, Mg, V, Ni, Cr, Zr, B (0.01 to 3 weight % per element)

These are optional elements which dissolves in aluminium matrix or precipitates as intermetallic compounds, to thereby enhance fatigue strength of the bearing alloy. When the additive amount of each of these elements is less than 0.01%, the effect of addition can not be expected. When it exceeds 3%, conformability as a bearing is deteriorated, and also, plastic workability of the bearing alloy is degraded.

(4) Cu (0.2 to 5 weight %)

Cu increases the strength of aluminium matrix, and especially, it is significantly effective for increasing the fatigue strength. When the additive amount is less than 0.2%, the expected effect can not be provided. When it exceeds 5%, the alloy becomes too hard. As a result, conformability as a bearing is deteriorated, and also, plastic workability of the bearing alloy is degraded.

(5) Pb (0.1 to 3 weight %)

Pb improves machinability and anti-seizure property of the bearing alloy. When the additive amount is less than 0.1%, the expected effect of addition can not be provided. When it exceeds 3%, it is extremely difficult to distribute lead uniformly in aluminium matrix. Further, such addition affects the strength.

(6) Sb (0.1 to 3 weight %)

Sb improves mechanical properties of the aluminium matrix. When Sb coexists with Pb, it causes lead to distribute in aluminium matrix finely and uniformly. When the additive amount of Sb is less than 0.1%, the above-mentioned effect is small. When it exceeds 3%, mechanical properties of the bearing alloy are unfavorably deteriorated. Especially, elongation is decreased.

(7) Ti (0.01 to 1 weight %)

Ti dissolves in aluminium matrix or precipitates as intermetallic compounds, to thereby enhance fatigue strength of the bearing alloy. When the additive amount is less than 0.01%, the expected effect of addition can not be obtained. When it exceeds 1%, conformability as a bearing is deteriorated, and also, plastic workability of the bearing alloy is degraded.

The reasons of the amount limitation of each component of an aluminium alloy as an intermediate bonding layer will be described below.

(1) Mn, Cu, Mg (at least one element of these: up to 1.7% Mn, up to 1.2% Cu and up to 1.8% Mg)

Mn and Mg dissolve in aluminium matrix or precipitate as intermetallic compounds to improve fatigue strength of the alloy. Cu improves aluminium matrix in strength and is significantly effective in improving fatigue strength. If amount of those elements exceed the respective upper limitation, the alloy is deteriorated conformability with a mating member and plastic workability.

(2) Si, Cr, Ti, Fe (at least one element of these: 0 to 3 weight % in total)

Those strengthening elements dissolves in aluminium matrix, or crystallizes and precipitates finely, but they will not produce coarse compounds. When the additive amount of at least one element of them exceeds 3 weight % in total, the alloy becomes too hard.

Embodiments of the present invention will be hereinafter described.

Table 1 shows comparative examples which are combinations of Al—Sn bearing alloys and aluminium alloys of intermediate bonding layers (each combination being denoted by a sample number), with alloy compositions, hardness and the hardness rate (rate of a hardness B of an aluminium alloy of an intermediate bonding layer to a hardness A of an Al—Sn bearing alloy: (B/A)×100%) of each combination being specified. Table 2 shows invention examples, with substantially the same factors being specified. A plate of Al—Sn bearing alloy and a plate of aluminium alloy as an intermediate bonding layer were prepared for each of the combinations. Those plates were produced through normal molding and rolling processes. For each of the combinations, a plate of Al—Sn bearing alloy and a plate of aluminium alloy as an intermediate bonding layer were placed one above the other, bonded integrally with each other by rolling, and formed into a composite aluminium alloy plate. A backing plate of low-carbon steel, which contains 0.04 to 0.35 weight % carbon, was placed on the intermediate bonding layer side of the composite plate thus obtained, and those two plates were rolled at reduction rate of 35 to 50% and formed integrally into a multi-layer bearing material. The multi-layer baring material was machined into a bearing having a semi-circular cross-sectional configuration. Of the bearing thus produced, the intermediate bonding layer had a thickness of 0.02 to 0.06 mm, the backing plate layer had a thickness of 1.17 to 1.23 mm, and the overall thickness of the bearing was 1.5 mm. As another comparative example, a plate of Al—Sn bearing alloy was directly placed on nickel-plated backing steel plate, and those two plates were rolled into a bearing material, from which a bearing having a semicircular cross-sectional configuration was similarly obtained.

Fatigue tests of those bearings were carried out by two kinds of testing machines under the conditions shown in Tables 3 and 4. In a fatigue test specified in Table 3, a test shaft and each of the bearings are contacted relatively uniformly. However, in a fatigue test specified in Table 4, an eccentric test shaft is employed so that each of the bearings and the test shaft will be contacted somewhat partially. Thus, the fatigue test of Table 4 requires more conformability than that with the testing machine of Table 3. Results of those tests are shown in FIGS. 1 and 2.

In those embodiments, an overlay was not employed so that the effect produced by the combination of the Al—Sn bearing alloy with the aluminium alloy of the intermediate bonding layer will be expressed remarkably. However, an overlay of an alloy of lead or the like may be formed on the bearing alloy. When an overlay is formed, an intermediate layer of Cu or Ni may be interposed between the Al—Sn bearing alloy and the overlay, so as to improve bonding effectiveness therebetween.

In Table 1, Nos. 1 to 15 are the examples to be compared with the invention examples. In Nos. 1, 3, 4, 6 to 9 of the comparative examples, intermediate bonding layers softer than a range of hardness of intermediate layers according to the present invention are used, whereas in Nos. 2, 5, 10 to 13, intermediate bonding layers harder than this hardness range are used. In Nos. 14 and 15, although hardness of intermediate layers is within the range of the invention, hardness of bearing alloys is lower than a range according to the invention. Nos. 16 to 30 are the invention examples.

Of the comparative examples, Nos. 1 to 13 correspond to Nos. 16 to 28 of the invention examples, in each of which the same Al—Sn alloy is used.

The following can be understood from analysis of the results of the above-described tests (FIGS. 1 and 2).

In either of the fatigue tests 1 and 2, it is obvious that the invention examples are generally more excellent in fatigue strength than the comparative examples. Especially, the following results are characteristic.

Results of the fatigue test show that fatigue is caused by a lower load in the comparative examples Nos. 1, 3, 4, 6 to 9 than in the invention examples Nos. 16, 18, 19, 21 to 24, and that fatigue is caused by an absolutely low load in the comparative examples Nos. 14 and 15. Results of Nos. 2, 5, 10 to 13 are substantially the same as or slightly worse than results of the corresponding invention examples.

Further, it is understood from results of the fatigue test 2 that fatigue is caused by a much lower load in the comparative examples Nos. 2, 5, 10 to 13 which do not exhibit very favorable results in the fatigue test 1, than in the corresponding invention examples Nos. 17, 20, 25 to 28. Especially, No. 10 with Ni plating had an extremely unfavorable result. This result is thought to be affected by conformability and cushion property as a bearing.

As described heretofore, the invention bearings are improved in fatigue resistance and conformability as compared with the conventional bearings. Thus, the objective of the invention can be achieved.

TABLE 1

| Sample No. Comparative Example | Chemical composition of Bearing alloy (wt %) | | | | | | | | | | | | | | Hardness of Bearing alloy (Hv5) |
|---|---|---|---|---|---|---|---|---|---|---|---|---|---|---|---|
| | Al | Sn | Si | Mn | Mg | V | Ni | Cr | Zr | B | Cu | Pb | Sb | Ti | |
| 1 | Bal. | 7.0 | 3.0 | — | — | — | — | — | — | — | — | — | — | — | 50 |
| 2 | Bal. | 7.0 | — | 0.01 | — | — | — | 0.1 | — | 5.0 | 0.1 | — | — | | 61 |
| 3 | Bal. | 10.0 | 1.0 | 0.1 | 0.01 | 0.1 | — | — | — | — | 1.5 | — | — | — | 53 |
| 4 | Bal. | 10.0 | 1.5 | 0.4 | — | 0.2 | — | — | — | — | 1.0 | 1.0 | 0.2 | 0.2 | 63 |
| 5 | Bal. | 10.0 | 2.0 | 0.4 | — | — | 1.0 | — | — | — | 1.2 | — | 0.3 | — | 55 |
| 6 | Bal. | 10.0 | — | 3.0 | — | 0.3 | — | 0.5 | — | — | 2.0 | 1.5 | — | — | 73 |
| 7 | Bal. | 10.0 | 1.0 | 0.3 | — | 0.01 | 3.0 | — | — | — | 2.8 | — | — | — | 70 |
| 8 | Bal. | 12.0 | 2.5 | 0.3 | — | 0.1 | — | — | — | — | 0.9 | 1.5 | 0.3 | — | 59 |
| 9 | Bal. | 15.0 | 3.0 | — | — | 0.15 | — | — | — | — | 2.0 | 1.7 | 0.3 | 0.01 | 57 |
| 10 | Bal. | 15.0 | — | 1.0 | 3.0 | — | 0.1 | 0.2 | 0.01 | — | 2.0 | — | — | — | 79 |
| 11 | Bal. | 15.0 | 3.0 | 0.2 | — | — | 0.01 | 0.01 | — | 3.0 | 1.5 | 0.8 | 0.1 | 0.05 | 54 |
| 12 | Bal. | 15.0 | 1.2 | 0.4 | 0.5 | — | — | — | — | 0.01 | 0.5 | 1.5 | 3.0 | 1.0 | 53 |
| 13 | Bal. | 20.0 | 2.0 | — | — | 3.0 | — | — | — | — | — | 3.0 | 1.0 | — | 61 |
| 14 | Bal. | 20.0 | 1.5 | 0.5 | — | 0.15 | — | — | — | — | 0.8 | 1.0 | 0.3 | — | 47 |
| 15 | Bal. | 20.0 | 2.5 | — | — | 0.3 | — | — | — | — | 1.0 | 1.5 | 0.5 | — | 45 |

| Sample No. Comparative Example | Chemical Composition of Intermediate Bonding Layer (wt %) | | | | | | | Hardness of Intermediate Bonding Layer (Hv5) | Hardness rate* (%) |
|---|---|---|---|---|---|---|---|---|---|
| | Al | Mn | Cu | Mg | Si | Cr | Ti | Fe | | |
| 1 | Bal. | — | 0.3 | 0.8 | 1.0 | — | — | — | 30 | 60.0 |
| 2 | Bal. | — | 1.0 | 1.5 | — | 0.5 | — | — | 57 | 93.4 |
| 2 | Bal. | — | 0.5 | 0.5 | 1.0 | 0.3 | 0.2 | 1.0 | 35 | 66.0 |
| 4 | Bal. | — | 0.5 | 0.5 | 1.0 | 0.3 | 0.2 | 1.0 | 35 | 55.5 |
| 5 | Bal. | — | 1.0 | 1.5 | — | 0.5 | — | — | 57 | 103.6 |
| 6 | Bal. | 1.7 | 0.1 | — | — | — | 0.3 | — | 45 | 61.6 |
| 7 | Bal. | 1.7 | 0.1 | — | — | — | 0.3 | — | 45 | 64.3 |
| 8 | Bal. | — | — | — | 2.5 | 0.3 | 0.2 | — | 38 | 64.4 |
| 9 | Bal. | — | — | — | 2.5 | 0.3 | 0.2 | — | 38 | 66.7 |
| 10 | Ni plating | | | | | | | | — | — |
| 11 | Bal. | | — | 1.8 | — | 0.2 | — | — | 50 | 92.6 |
| 12 | Bal. | | 1.0 | 1.5 | — | 0.5 | — | — | 57 | 107.5 |
| 13 | Bal. | | 1.0 | 1.5 | — | 0.5 | — | — | 57 | 93.4 |
| 14 | Bal. | — | 0.5 | 0.5 | 1.0 | 0.3 | 0.2 | 1.0 | 35 | 74.5 |
| 15 | Bal. | — | — | — | 2.5 | 0.3 | 0.2 | — | 38 | 84.4 |

*Hardness Rate = Hardness of Intermediate Bonding layer/Hardness of Bearing alloy

TABLE 2

| Sample No. Comparative Example | Chemical composition of Bearing alloy (wt %) | | | | | | | | | | | | | | Hardness of Bearing alloy (Hv5) |
|---|---|---|---|---|---|---|---|---|---|---|---|---|---|---|---|
| | Al | Sn | Si | Mn | Mg | V | Ni | Cr | Zr | B | Cu | Pb | Sb | Ti | |
| 16 | Bal | 7.0 | 3.0 | — | — | — | — | — | — | — | — | — | — | — | 50 |
| 17 | Bal. | 7.0 | — | 0.01 | — | — | — | 0.1 | — | 5.0 | 0.1 | — | — | | 61 |
| 18 | Bal. | 10.0 | 1.0 | 0.1 | 0.01 | 0.1 | — | — | — | — | 1.5 | — | — | — | 53 |
| 19 | Bal. | 10.0 | 1.5 | 0.4 | — | 0.2 | — | — | — | — | 1.0 | 1.0 | 0.2 | 0.2 | 63 |
| 20 | Bal. | 10.0 | 2.0 | 0.4 | — | — | 1.0 | — | — | — | 1.2 | — | 0.3 | — | 55 |
| 21 | Bal. | 10.0 | — | 3.0 | — | 0.3 | — | 0.5 | — | — | 2.0 | 1.5 | — | — | 73 |

TABLE 2-continued

| Sample No. | Al | Sn | Mn | Cu | Mg | Si | Cr | Ti | Fe | ... | ... | ... | ... | Hardness |
|---|---|---|---|---|---|---|---|---|---|---|---|---|---|---|
| 22 | Bal. | 10.0 | 1.0 | 0.3 | — | 0.01 | 3.0 | — | — | — | 2.8 | — | — | — | 70 |
| 23 | Bal. | 12.0 | 2.5 | 0.3 | — | 0.1 | — | — | — | — | 0.9 | 1.5 | 0.3 | — | 59 |
| 24 | Bal. | 15.0 | 3.0 | — | — | 0.15 | — | — | — | — | 2.0 | 1.7 | 0.3 | 0.01 | 57 |
| 25 | Bal. | 15.0 | — | 1.0 | 3.0 | — | 0.1 | 0.2 | 0.01 | — | 2.0 | — | — | — | 79 |
| 26 | Bal. | 15.0 | 3.0 | 0.2 | — | — | 0.01 | 0.01 | — | 3.0 | 1.5 | 0.8 | 0.1 | 0.05 | 54 |
| 27 | Bal. | 15.0 | 1.2 | 0.4 | 0.5 | — | — | — | — | 0.01 | 0.5 | 1.5 | 3.0 | 1.0 | 53 |
| 28 | Bal. | 20.0 | 2.0 | — | — | 3.0 | — | — | — | — | — | 3.0 | 1.0 | — | 61 |
| 29 | Bal. | 20.0 | 1.5 | — | — | — | — | 3.0 | — | — | 0.8 | 1.0 | 0.2 | — | 59 |
| 30 | Bal. | 20.0 | — | — | — | — | — | — | 0.3 | — | 0.2 | — | — | — | 57 |

| Sample No. Comparative Example | Chemical Composition of Intermediate Bonding Layer (wt %) | | | | | | | | Hardness of Intermediate Bonding Layer (Hv5) | Hardness rate* (%) |
|---|---|---|---|---|---|---|---|---|---|---|
| | Al | Mn | Cu | Mg | Si | Cr | Ti | Fe | | |
| 16 | Bal. | — | — | — | 2.5 | 0.3 | 0.2 | — | 38 | 76.0 |
| 17 | Bal. | 1.7 | 0.1 | — | — | — | 0.3 | — | 45 | 73.8 |
| 18 | Bal. | 1.7 | 0.1 | — | — | — | 0.3 | — | 45 | 84.9 |
| 19 | Bal. | — | — | 1.8 | — | 0.2 | — | — | 50 | 79.4 |
| 20 | Bal. | 1.0 | 1.2 | 0.5 | 0.8 | — | — | — | 48 | 87.3 |
| 21 | Bal. | — | 1.0 | 1.5 | — | 0.5 | — | — | 57 | 78.1 |
| 22 | Bal. | — | 1.0 | 1.5 | — | 0.5 | — | — | 57 | 81.4 |
| 23 | Bal. | 1.0 | 1.2 | 0.5 | 0.8 | — | — | 0.7 | 48 | 81.4 |
| 24 | Bal. | 1.3 | 0.2 | — | — | — | — | — | 40 | 70.2 |
| 25 | Bal. | — | 1.0 | 1.5 | — | 0.5 | — | — | 57 | 72.2 |
| 26 | Bal. | 1.3 | 0.2 | — | — | — | — | — | 40 | 74.1 |
| 27 | Bal. | 1.3 | 0.2 | — | — | — | — | — | 40 | 75.5 |
| 28 | Bal. | 1.0 | 1.2 | 0.5 | 0.8 | — | — | 0.7 | 48 | 81.4 |
| 29 | Bal. | 1.7 | 0.1 | — | — | — | 0.3 | — | 45 | 76.3 |
| 30 | Bal. | 1.7 | 0.1 | — | — | — | 0.3 | — | 45 | 78.9 |

*Hardness Rate = Hardness of Intermediate Bonding layer/Hardness of Bearing alloy

TABLE 3

| Test conditions Fatigue test 1 | |
|---|---|
| Testing machine | Soda-type fatigue testing machine |
| Rotational speed | 4000 r.p.m. |
| Test time | 20 hours |
| Circumferential Speed | 11.1 m/second |
| Supplied oil temperature | 120° C. |
| Pressure of oil supply | 3.0 Kg/cm² |
| Lubbricant oil | #20 motor oil |

TABLE 4

| Test conditions Fatigue test 2 | |
|---|---|
| Testing machine | Sapphire-type fatigue testing machine |
| Rotational speed | 3250 r.p.m. |
| Test time | 20 hours |
| Circumferential Speed | 9.0 m/second |
| Supplied oil temperature | 120° C. |
| Pressure of oil supply | 3.0 Kg/cm² |
| Lubbricant oil | #20 Motor oil |

What is claimed is:

1. A multi-layer slide bearing comprising an Al—Sn bearing alloy layer which has high fatigue strength and good conformability with a mating sliding contact member, further comprising a backing steel plate and an intermediate bonding layer of another aluminium alloy,
wherein said Al—Sn bearing alloy consists essentially of, by weight, 7 to 20% Sn, and balance of Al and unavoidable impurities, and has a hardness of Hv 50 to 80,
said intermediate bonding layer of the aluminium alloy consists essentially of, by weight, at least one of up to 1.7% Mn, up to 1.2% Cu and up to 1.8% Mg, and balance of Al and unavoidable impurities, and a hardness rate of said intermediate bonding layer of the aluminium alloy to said Al—Sn bearing alloy in terms of Vickers hardness (Hv) exceeds 70% and is not more than 90%.

2. A multi-layer slide bearing according to claim 1, wherein said Al—Sn alloy further consists essentially of at least one of 0.01 to 3% each of Mn, Mg, V, Ni, Cr, Zr and B, 0.2 to 5% Cu, 0.1 to 3% Pb, 0.1 to 3% Sb, and 0.01 to 1% Ti.

3. A multi-layer slide bearing according to claim 2, wherein said aluminium alloy of the intermediate bonding layer further consists essentially of up to 3 weight % in total at least one of Si, Cr, Ti and Fe.

4. A multi-layer slide bearing according to claim 3, wherein an overlay made of Sn, Pb or an alloy whose main component is Sn or Pb is formed on said Al—Sn bearing alloy layer.

5. A multi-layer slide bearing according to claim 4, wherein at least the sliding contact surface or the entirety surface of the slide bearing is plated with Sn or Pb by flash process.

6. A multi-layer slide bearing according to claim 2, wherein an overlay made of Sn, Pb or an alloy whose main component is Sn or Pb is formed on said Al—Sn bearing alloy layer.

7. A multi-layer slide bearing according to claim 2, wherein at least the sliding contact surface or the entirety surface of the slide bearing is plated with Sn or Pb by flash process.

8. A multi-layer slide bearing according to claim 1, wherein said aluminium alloy of the intermediate bonding layer further consists essentially of up to 3 weight % in total at least one of Si, Cr, Ti and Fe.

9. A multi-layer slide bearing according to claim 8, wherein an overlay made of Sn, Pb or an alloy whose main component is Sn or Pb is formed on said Al—Sn bearing alloy layer.

10. A multi-layer slide bearing according to claim 8, wherein at least the sliding contact surface or the entirety surface of the slide bearing is plated with Sn or Pb by flash process.

11. A multi-layer slide bearing according claim 1, wherein an overlay made of Sn, Pb or an alloy whose main component is Sn or Pb is formed on said Al—Sn bearing alloy layer.

12. A multi-layer slide bearing according to claim 11, wherein at least the sliding contact surface or the entirety surface of the slide bearing is plated with Sn or Pb by flash process.

13. A multi-layer slide bearing according claim 1, wherein at least the sliding contact surface or the entirety surface of the slide bearing is plated with Sn or Pb by flash process.

14. A multi-layer slide bearing comprising an Al—Sn bearing alloy layer which has high fatigue and good conformability with a mating sliding contact member, further comprising strength a backing steel plate and an intermediate bonding layer of another aluminium alloy,
wherein said Al—Sn bearing alloy consists essentially of, by weight, 7 to 20% Sn, not more than 4% Si, and balance of Al and unavoidable impurities, and has a hardness of Hv 50 to 80,
said intermediate bonding layer of the aluminium alloy consists essentially of, by weight, at least one of up to 1.7% Mn, up to 1.2% Cu and up to 1.8% Mg and balance of Al and unavoidable impurities, and a hardness rate of said intermediate bonding layer of the aluminium alloy to said Al—Sn bearing alloy in terms of Vickers hardness (Hv) exceeds 70% and is not more than 90%.

15. A multi-layer slide bearing according to claim 14, wherein said Al—Sn alloy further consists essentially of at least one of 0.01 to 3% each of Mn, Mg, V, Ni, Cr, Zr and B, 0.2 to 5% Cu, 0.1 to 3% Pb, 0.1 to 3% Sb, and 0.01 to 1% Ti.

16. A multi-layer slide bearing according to claim 15, wherein said aluminium alloy of the intermediate bonding layer further consists essentially of up to 3 weight % in total at least one of Si, Cr, Ti and Fe.

17. A multi-layer slide bearing according to claim 15, wherein an overlay made of Sn, Pb or an alloy whose main component is Sn or Pb is formed on said Al—Sn bearing alloy layer.

18. A multi-layer slide bearing according to claim 14, wherein said aluminium alloy of the intermediate bonding layer further consists essentially of up to 3 weight % in total at least one of Si, Cr, Ti and Fe.

19. A multi-layer slide bearing according to claim 14, wherein an overlay made of Sn, Pb or an alloy whose main component is Sn or Pb is formed on said Al—Sn bearing alloy layer.

20. A multi-layer slide bearing according to claim 14, wherein at least the sliding contact surface or the entirety surface of the slide bearing is plated with Sn or Pb by flash process.

21. A multi-layer slide bearing comprising an Al—Sn bearing alloy layer which has high fatigue and good conformability with a mating sliding contact member, further comprising a backing steel plate and an intermediate bonding layer of a second aluminum alloy,
wherein said Al—Sn bearing alloy consists essentially of, by weight, 7 to 20 Sn, optionally Si in an amount not more than 4%, and balance of Al and unavoidable impurities, and has a hardness of Hv 50 to 80,
said second aluminum alloy forming said intermediate bonding layer being selected from the group consisting of (1) Al and unavoidable impurities, (2) at least one of Mn, Cu and Mg in amounts by weight of up to 1.7% Mn, up to 1.2% Cu and up to 1.8% Mg, and the balance being Al and unavoidable impurities, (3) at least one of Si, Cr, Ti and Fe in a total amount up to 3 weight percent, and balance Al and unavoidable impurities, and (4) at least one of Mn, Cu and Mg in amount of up to 1.7 weight percent Mn, up to 1.2 weight percent Cu and up to 1.8 weight percent Mg, at least one of Si, Cr, Ti and Fe in a total amount of up to 3 weight percent, and balance of Al and unavoidable impurities,
said intermediate bonding layer having a hardness rate in terms of Vicker's hardness (Hv) of between 70% and 90% of the Vicker's hardness of said Al—Sn bearing alloy.

* * * * *